June 27, 1939. J. G. WILSON 2,164,265
STOVE
Filed June 11, 1938 2 Sheets-Sheet 1

Inventor
J. G. Wilson
By Clarence A. O'Brien
and Hyman Berman
Attorneys

June 27, 1939.    J. G. WILSON    2,164,265
STOVE
Filed June 11, 1938    2 Sheets-Sheet 2

Inventor
J. G. Wilson
By Clarence A. O'Brien
and Hyman Berman
Attorneys

Patented June 27, 1939

2,164,265

UNITED STATES PATENT OFFICE 2,164,265

STOVE

James G. Wilson, Welch, W. Va., assignor of one-half to John K. Cooper, Premier, W. Va.

Application June 11, 1938, Serial No. 213,253

4 Claims. (Cl. 219—35)

This invention relates to stoves, and an object of the invention is to provide a stove which may be used with facility for heating and cooking purposes.

An object of the invention is to provide a stove characterized by low cost of operation, simplicity in construction; and otherwise fully capable of serving both as a cooking stove and as a heater.

A further object of the invention is to provide an electric stove of the character above mentioned.

The invention, together with its objects and advantages will be best understood from a study of the following description taken in connection with the accompanying drawings, wherein:

Fig. 2 is a horizontal sectional view through the stove.

Fig. 3 is a vertical transverse sectional view taken substantially on the line 3—3 of Fig. 1, and Fig. 4 is a fragmentary detail sectional view showing a valve assembly hereinafter more fully referred to.

Figure 1:
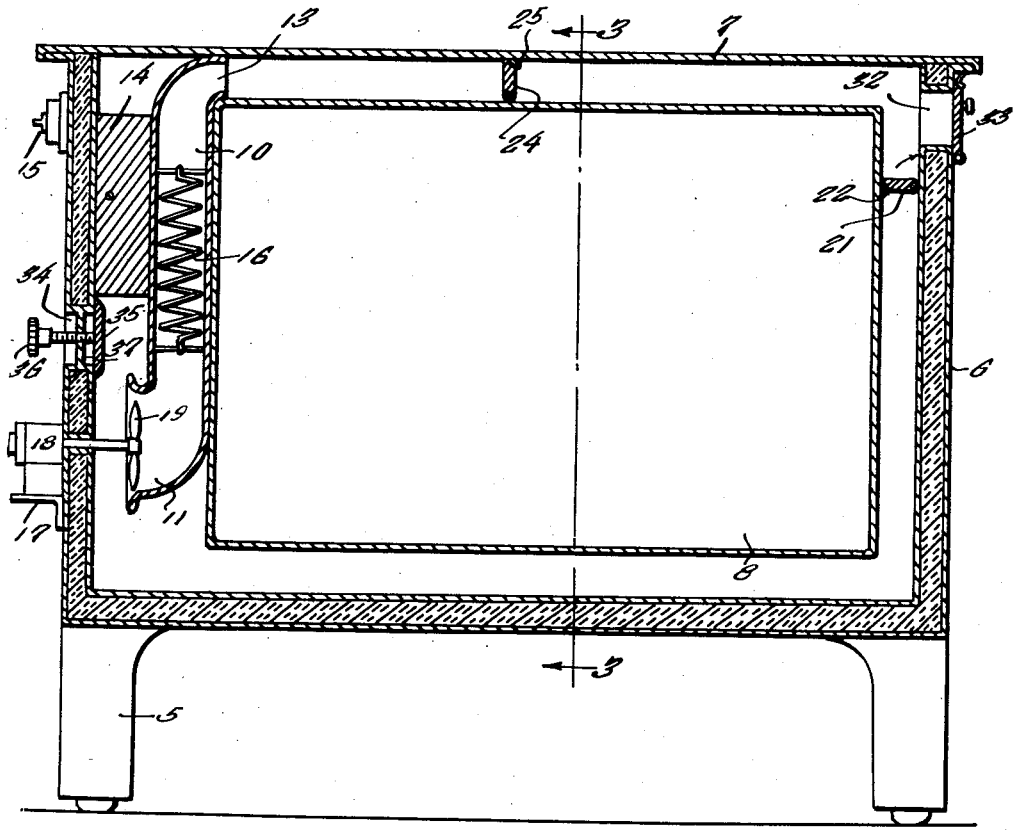
Figure 1 is a vertical sectional view through a stove embodying the features of the present invention.

Referring to the drawings by reference numerals, it will be seen that in accordance with the present invention, the stove, mounted on suitable legs 5 embodies an outer casing or shell 6, the bottom and vertical walls of which are insulated as shown, while the top wall 7 is formed of metal or other suitable material which will heat rapidly and cool within a relatively short space of time.

Suitably mounted within the shell or casing 6 of the stove and spaced from the walls of the casing at the top, bottom and ends thereof, is an oven 8 to which access is had through the medium of a suitably provided door 9 at the front of the stove.

Suitably mounted within the stove casing 6 at one end of the latter and spaced from opposite side walls of the casing and from the bottom wall of the casing is a vertical air duct 10 that at its lower end is provided with an enlarged bell-shaped inlet 11. At the top thereof, the duct 11 is provided with an outlet 13 that opens into the space between the top 7 of the casing and the top of the oven 8.

Interposed between the adjacent end walls of the casing 6 and the air duct 10 is a block 14 of insulating material which accommodates the wires that connect an electric switch 15 suitably mounted on the said end wall of the casing 6 with a plurality, in the present instance four, of vertically disposed electric heaters or resistance wires 16 suitably mounted within the air duct 10 as shown.

Mounted on a suitable shelf or platform 17 supported on the aforementioned end wall of the stove casing 6 is an electric motor 18, the armature shaft of which extends inwardly to terminate within the inlet mouth 11 of the air duct 10, and on said end of the motor shaft is a fan 19 which serves to cause a forced circulation of air through the duct 10 and within the casing 6 around the oven 8. Obviously the air in passing through the duct 10 is heated through the medium of the heating coils 16.

When it is desired to concentrate the heated air at the top of the stove for heating the top 7 to a degree sufficient to permit use of the stove for cooking purposes, a valve 21 is closed. Valve 21 as shown, extends between the front and rear walls of the stove casing 6 and is arranged within the space between the end wall of the casing 6 farthest remote from the heater and the confronting end wall of the oven 8, being hinged to the said end wall of the casing 6 to swing in the direction indicated by the arrow in Fig. 1. Provided on the confronting end wall of the oven 8 is a stop 22 for supporting the valve 21 in closed position. The pivot rod for the valve 21 extends outwardly through an opening therefor in the front wall of the casing 6 and is equipped with a knob 23 to facilitate adjustment of the valve.

Obviously with valve 21 in closed position the heated air flowing over the top of the oven beneath the top 7 of the casing will strike the closed valve causing a back pressure of this heater air at the top of the stove resulting in the top 7 of the stove becoming very hot so that the stove can be used for cooking purposes.

Also, when it is desired to concentrate the heat in a manner to heat only a portion of the top 7 valve 24 is swung to a closed position. The valve 24 is disposed within the space between the top 7 of the stove casing 6 and the top of the oven 8 and is mounted so as to swing vertically to open and closed position. Swinging movement of the valve 24 to the closed position is limited by a stop 25 pivotally provided on the under side of the top 7 of the stove casing and the valve 24 is manipulated from the front side of the stove through the medium of a knob 26 provided on the end of the pivot rod provided for the valve.

Also provided within the casing 6 and at opposite sides of the insulation box 14 adjacent the top of the stove are vertically swingable valves 27. For one of the valves 27 there is provided a pivot rod 28 that extends transversely of the stove casing from the front to the rear thereof while for the other of the valves 27 there is provided a tubular shaft 29 which accommodates the shaft 28. For the shafts 28 and 29, there are provided at the front side of the stove manipulating knobs 30 and 31. Thus it will be seen that the valves 27 are operable independently of one another and when in closed position have their free end edges abutting against the adjacent end wall of the oven 8 as shown in Fig. 4. It will also be apparent that when valves 27 are closed, the hot air issuing from the outlet 13 of the duct 10 will be prevented from flowing back, the heated air, with valves 27 closed being caused to flow through the space between the top 7 of the stove casing 6 and the top of the oven to circulate as permitted by the position of adjustment of valves 24 and 24.

When the hot air is to be used for heating a room or the like, said hot air is permitted to issue from the stove casing through an outlet 32 provided in the end wall of the casing 6 farthest remote from the air duct 10 and above the valve 21. For the hot air outlet 32 there is provided a suitable closure 33.

Also the end wall of the casing 6, on which is mounted motor 18, is provided with a cold air inlet 34 through which the air from the room or surrounding atmosphere may pass into the stove casing to be heated in its circulation through the stove casing. For controlling the opening 34, there is provided interiorly of the stove casing, and as shown, a valve plate 35. Plate 35 is mounted on the inner end of an adjustment bolt 36, the threaded shank portion of which threads through the hub of a supporting spider 37 provided therefor within the opening 34. Obviously by threading the bolt 36 inwardly or outwardly, plate 35 is adjusted relative to the opening 34 for controlling the entrance of the cold air into the stove casing.

From the above it will be seen that I have provided an electric stove which may be used, with facility, for either cooking, or heating purposes, or both, as may be found desirable.

It is thought that a clear understanding of the construction, utility, operation, and advantages of a stove embodying the features of the present invention will be had without a more detailed description.

Having thus described the invention, what is claimed as new is:

1. In a stove of the character described, an outer casing all of the walls of which except the top are insulated, an oven arranged within said casing and having certain walls thereof spaced from corresponding walls of said casing, an air duct arranged within the casing and disposed within the space between an end wall of the casing and the adjacent end wall of the oven, said duct being of a width less than the width of said end wall of the casing to provide air passages communicating between the top and bottom of the casing independent of the duct, valves for said passages, said air duct having an inlet end disposed adjacent the bottom of the casing, and a hot air outlet end opening into the space between the top of the oven and the top of said casing, means for causing a forced circulation of air through said duct, and an electric heating device arranged within said duct.

2. In a stove of the character described, an outer casing all of the walls of which except the top are insulated, an oven arranged within said casing and having certain walls thereof spaced from corresponding walls of said casing, an air duct arranged within the casing and disposed within the space between an end wall of the casing and the adjacent end wall of the oven, said duct being of a width less than the width of said end wall of the casing to provide air passages communicating between the top and bottom of the casing independent of the duct, valves for said passages, said air duct having an inlet disposed adjacent the bottom of the casing, a hot air outlet end opening into the space between the top of the oven and the top of said casing, means for causing a forced circulation of air through said duct, an electric heating device arranged within said duct, a cold air inlet and a hot air outlet in opposite walls of the casing, and said air circulating means including a motor driven fan arranged within the air inlet of said duct.

3. In a stove of the character described, an outer casing all the walls of which except the top are insulated, an oven arranged within said casing and having certain walls thereof spaced from corresponding walls of said casing, an air duct arranged within the casing and disposed within the space between an end wall of the casing and the adjacent end wall of the oven, said air duct having an inlet end disposed adjacent the bottom of the casing, a hot air outlet end opening into the space between the top of the oven and the top of said casing, means for causing a forced circulation of air through said duct, an electric heating device arranged within said duct, said casing having in one wall thereof cold air inlets, said air circulating means including a motor driven fan arranged within the air inlet of said duct, and valves arranged in the space between the walls of the casing and the oven and controlling the circulation of heated air within the casing, said valve arrangement being such as to concentrate the heated air beneath a portion or all of the top of the casing when desired.

4. In a stove of the character described, an outer casing all the walls of which except the top are insulated, an oven arranged within said casing and having certain of its walls spaced from corresponding walls of the casing to provide an air passage extending continuously around the oven, a tubular air duct in the passage having its opposite ends communicating with the upper and lower portions of the passage, said passage having continuous communication independent of the duct, electric heating elements in the duct and means for closing communication through the passage and comprising pivoted valve members extending transversely of the passage at spaced points therein to confine the heated air to the top of the casing or to a portion thereof.

JAMES G. WILSON.